Aug. 31, 1948.　　　B. E. ANDERSON　　　2,448,071
ORIFICE EXCHANGER
Filed Aug. 12, 1944
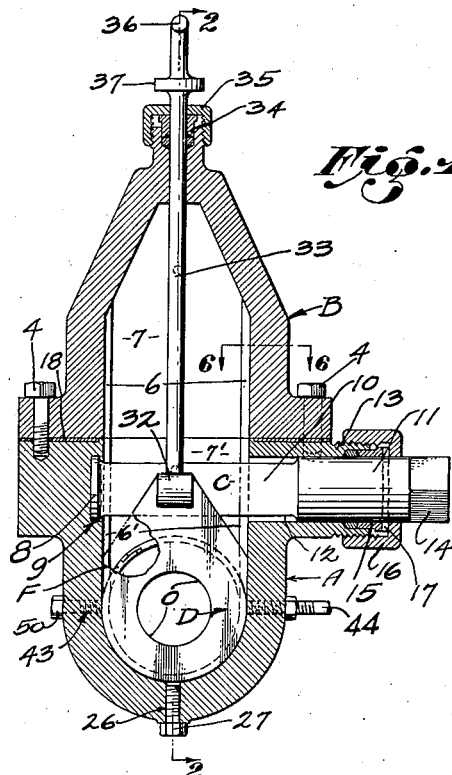
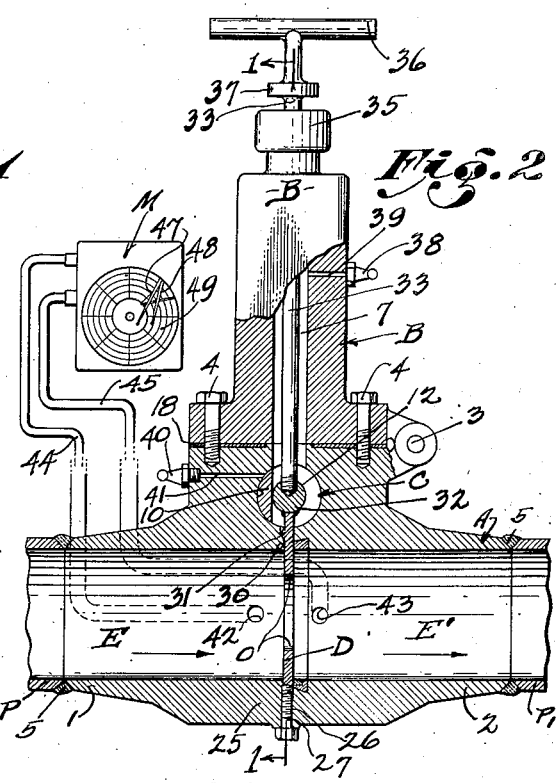
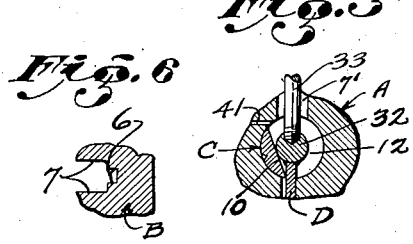
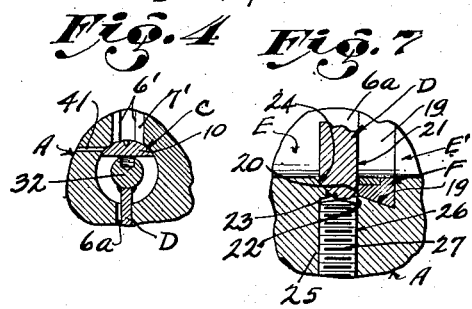
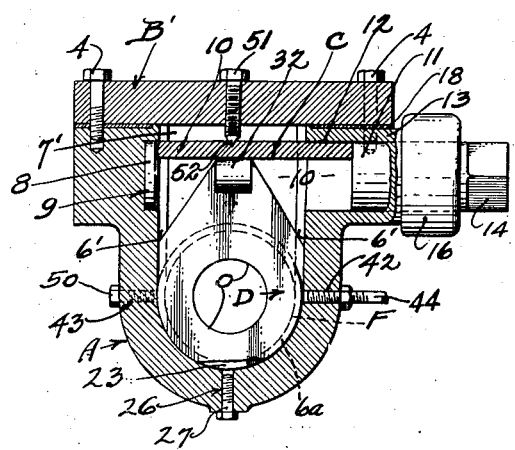
BERT E. ANDERSON
INVENTOR.
ATTORNEY Patented Aug. 31, 1948

2,448,071

UNITED STATES PATENT OFFICE 2,448,071

ORIFICE EXCHANGER

Bert E. Anderson, Los Angeles, Calif.

Application August 12, 1944, Serial No. 549,226

4 Claims. (Cl. 138—44)

This invention relates to and has for an object, the provision of an improved type of orifice exchanger which is arranged for connection with a conventional orifice meter for the purpose of measuring large volumes of gas or liquid which, in turn, are recorded on the meter as in other exchangers for the same purpose.

The structure and use of orifice exchangers and meters are well known in the art, and it is sufficient to state herein that in general practice exchangers have been used which embody a suitable casing connected at opposite extremities with a pipe through which the gas or liquid flows and in which orifice plates are mounted between said extremities. An orifice plate is transversely disposed across the flow channel of a pipe and has a single orifice therein which should be concentric with the flow channel of the casing and pipe for affording accurate results. Separate connections with an orifice meter are provided on the opposite sides of the orifice plate so that different recordings may be made on the meter for the up-stream or approach and the down-stream volumes and pressures.

Various types of exchangers are in commercial use, at least some of which are for many reasons inadequate and unsatisfactory particularly because the orifice plate is mounted adjacent sections of pipe and therefore requires a complete shut-down of a system or the installation of a by-pass, either of which expedients is unnecessarily expensive and occasions undue loss. It is necessary to occasionally clean the orifice plates or to vary the size of the orifice in a plate, thus requiring the shut-down or by-passing of the gas or liquid for a period of time while the orifice is enlarged or a substitute plate is installed.

Hence, it is an object of this invention to provide an exchanger embodying a casing attachable at its opposite extremities to different sections of a pipe line and provided with means for operatively but removably supporting the orifice plate, whereby the plate may be retracted from its operative position and cleaned or bodily removed for any purpose from its casing without occasioning a stoppage of the pipe line.

A further object is to provide a casing embodying stationary and relatively movable members each of which is arranged to adjustably receive and support the orifice plate, the stationary member serving to operatively support the plate while the movable member inoperatively supports the same, and valve means carried by the stationary member for closing the opening in the stationary member, thereby permitting a continuous flow of gas or liquid through the pipe line while the plate is being and after it has been transferred. Also, by the structure mentioned, the movable member with the orifice plate therein may be bodily removed from the stationary member for the purpose of cleaning the plate, substitution of a different plate therefor, or for other purposes.

Still another object is the provision of suitable means for centering and confining the orifice plate in operative position relative to the pipe line and the channel in the stationary member through which the gas or liquid is adapted to flow.

Other objects will appear as the description of my improvements progresses.

I have shown a preferred form of structure embodying my improvements in the accompanying drawing, subject to modification, within the scope of the appended claims, without departing from the spirit of my invention. In said drawing:

Fig. 1 is a vertical section of an orifice exchanger embodying my improvements as seen on line 1—1 of Fig. 2;

Fig. 2 is an elevation of the same partly in section on line 2—2 of Fig. 1;

Fig. 3 is a section of the valve in the plane of the sectional portion of Fig. 2 in which the valve is shown in plate scraping or cleaning position;

Fig. 4 is a sectional view of the valve shown in the same plane as that of Fig. 3 but showing the valve closed;

Fig. 5 is a sectional elevation similar to Fig. 1 except that the movable section of the exchanger casing has been removed from the stationary portion thereof and a plate closure has been applied in lieu thereof;

Fig. 6 is a fragmentary section on line 6—6 of Fig. 1; and

Fig. 7 is an enlarged fragmentary view in the plane of Fig. 2.

Briefly described, my orifice exchanger includes a stationary casing A adapted to be connected at its opposite extremities 1 and 2 with pipes P and P₁, respectively, which form parts of a pipe line for the transmission of gas or liquid; a relatively movable and removable section B centrally superposed on casing A and preferably hinged thereto as at 3 and additionally fixed to member A as by means of bolts 4; a valve C carried by member A, an orifice plate D mounted intermediate the pipe sections P and P₁ and a recording meter M connected with the up-stream and down-stream passages E and E′, respectively, arranged on opposite sides of the orifice plate D, Pipe sections P and P₁ may be connected with the extremities 1 and 2, respectively, of the casing A by any suitable means but as herein shown such connections are made by welded joints 5 formed in such a manner that the passages E and E' are perfectly smooth and free from internal projections or roughness throughout their extent in order that undue turbulence will not be created in said passages, particularly on the upstream section thereof. The entire structure of the exchanger unit is strong and more or less massive so as to withstand extreme high pressures.

The members A and B, as shown in Figs. 1 and 2, are formed with transversely opposite and vertically alined grooves 6 and 6' in which opposite peripheral portions of the orifice plate seat are slidable, the grooves 6 and 6' being connected at their lower extremities by an arcuate continuing portion 6a in member A. Members A and B also have mating chambers 7 and 7' formed therein at the lateral margins of which the grooves 6 and 6' are formed, as shown. Valve C is horizontally mounted in member A for rotation and is formed with an inner cylindrical portion 8 seated in a shallow bore 9, a cutaway segmental valve portion 10 extended transversely through the chamber 7', an outer cylindrical portion 11 seated in a bore 12 formed in a lateral extension 13 and an external wrench or handle receiving portion 14 by means of which said valve may be rotated. Nipple 13 carries a suitable packing gland which includes an external cup-like member 16 threaded on to nipple 13 and serving at the same time to hold the valve in operative position, as by means of a pin or flange 17 fixed to portion 11 of the valve and confined between the gland 15 and member 16, as shown in Fig. 1, or otherwise.

The form of valve C is such that when the valve is rotated to the position shown in Fig. 4 the portion 10 thereof will seal the chamber 7' in member A, and when portion 10 is positioned as in Fig. 2 the orifice plate D may be bodily raised from its seat into chamber 7 of top member B, after which the valve may be closed as in Fig. 4 and member B either swung on its hinge pintle 3 or completely removed from member A by detachment of bolts 4 and pintle 3. When member B is so adjusted or removed the plate D may be removed for any desired purpose and during its period of detachment the flow of an element through the pipe line is not interrupted. When member B is attached to member A and valve C is open, a suitable gasket 18 is held between said members for providing a suitable seal against leakage of pressure from the exchanger.

Member A is provided on the down stream side of plate D with a circular groove 19 for receiving and holding a split packing ring F of suitable form but as herein shown said ring has a bevelled outer periphery and a flat inner periphery and presents a flat face 20 to the down stream side 21 of plate D. The bottom of plate D is chamfered on opposite sides at 22 and 23 in order that the plate may be readily inserted in operative position, as it passes the upstream face of the ring F, the chamfered portion 23 being adapted to rest against a correspondingly chamfered portion 24 of the bottom 25 of member A. Immediately below plate D a threaded aperture 26 is provided in bottom 25 for receiving a screw 27 which serves as an adjuster for limiting the downward thrust of plate D to a position of exact concentricity with respect to the channels E and E'. It may be noted that the face 24 extends inwardly to a slight degree beyond the up-stream face of the plate D and serves as a fixed limiting element for the plate, while screw 27 serves as an adjustable limiting element for the plate. Screw 27 also serves as a plug for bore 26 and when removed permits of the draining of certain elements from the casing, such as sediment or cleaning solution.

Above channel E and opposite ring F, I provide a cam projection 30 which may be welded on the casing as indicated in Fig. 2 and a cooperating lug 31 which may be welded on plate D and which are so arranged as to come into operation when the plate D reaches the groove 6a to force the upper portion of the plate into sealing engagement with ring F while the inwardly and downwardly bevelled edge of the groove 6a guides the lower portion of the plate D into engagement with the ring F.

Plate D has a cylindrical member 32 affixed to its upper extremity as by means of welding or otherwise, which is of a diameter substantially equivalent to the width of chambers 7 and 7' in members B and A, respectively, and to which a vertical rod 33 is threadedly attached at its lower end for the purpose of raising and lowering the plate D. Member 32 is concentric with valve C in order that the segmental portion 10 of the valve may rotate therearound in the operation of the valve, as shown in Figs. 2, 3, and 4. Rod 33 is removably extended through the upper end of member B and is sealed against leakage at its point of emergence from member B as by means of a conventional packing gland 34 and a cooperating closure 35. Said rod is provided above member B with a handle 36 by means of which the rod may be turned for unscrewing the same from member 32 and is additionally provided with a flange set collar or nut as at 37 above the gland member 35 whereby a forked tool may be inserted between flange 37 and gland member 35 for retracting the rod from the casing, either with the plate still connected thereto or when the rod is detached from the plate, as the case may be.

A manually operable relief valve 38 is connected with chamber 7 of member B as by means of a port 39 for the purpose of relieving pressure in chamber 7 when it is intended to retract plate D upwardly into chamber 7. A pressure lubricating element 40 is applied to member A so that a suitable lubricant may be injected into the valve chamber and associated chambers 7 and 7' through a passage 41.

Plate D has a central orifice O which has sharp edges, at least on the up stream side thereof, and must be kept as free as possible from an accumulation of grit, sediment or other elements in order to accurately measure the flow and pressures of a gas or liquid delivered from passage E to passage E' therethrough. It is well known to all those who are skilled in the use of orifice meters that separate recordings are made of the pressures on opposite sides of the orifice plate. Hence, for the purpose of properly connecting the exchanger with the recording member M, I provide as a matter of convenience a pair of outlets 42, 42, and 43, 43, at diametrically opposite points on member A in order that one outlet of each pair on a selected side of the casing may be connected with the meter as by means of tubes 44 and 45, respectively, it being understood that the two meter connections lead from opposite sides (up stream and down stream) of the orifice plate D. Tubes 44 and 45 are connected with different recording indicators 47 and 48 operating over the face of a chart 49 on the meter. Thus, when the orifice plate is operatively positioned as shown in Figs. 1, 2, and 5, the prevailing pressures on the up stream and down stream sides of the plate are recorded on the chart when an element is flowing through the pipe line to which the exchanger is connected.

The necessity for keeping the plate D clean at all times is well known and in systems heretofore used, the plates have been necessarily removed from their casing for such purpose. In my exchanger, however, I provide means for scraping accumulated matter from the plate D while the same means is also effective for a valve, as at C. For example, as shown in Fig. 3, with the top member B in position on the member A by merely rotating the valve segment 10 into position where the leading edge thereof frictionally engages the face of the plate, said plate may be retracted upwardly into chamber 7 of member B and all matter will be removed therefrom so that when it is later extended to operative position, the plate will be free of such matter. Such cleaning operation is accomplishable without shutting down the pipe line and in a reasonably short time.

In systems embodying orifice methods there is frequently a maze of pipes and connections some of which are difficult of access. Hence, I provide the removable top member B which, when the valve C is closed, as shown in Fig. 4, may be bodily removed and in lieu thereof a heavy steel plate B' attached to member A by means of bolts 4. The substitution of plate B' for member B is occasioned without stopping the flow of an element through the exchanger or without stopping the operation of the recording meter M, for the reason that valve portion 10 seals the chamber 7' of the element under pressure against leakage.

Of course the outlets 42 and 43 which are not used for establishing connections with the meter M are closed as by means of plugs 50.

In operation, when the body A is appropriately connected in a pressure pipe line (P and P₁) and plate D has been accurately positioned so that the orifice O will be concentric with the channels E and E', the top section B of the casing having been secured to member A, the valve C will assume a position as shown in Fig. 2 which will permit the retraction of the plate D upwardly into member B and at the same time seals the lubricant opening 41. Thus, the flow of gas or liquid through channels E and E' as well as through orifice O is continuous and the pressures on opposite sides of plate D are separately recorded on meter M. At any time the plate D may be retracted into chamber 7 of member B for the purpose of cleaning, substitution or examination, following which the valve C is operated to close communication between chambers 7 and 7'. Then the bolts 4 may be removed and the member B swung outwardly to a sufficient extent to permit access to plate D, or, if necessary, member B may be removed from member A and plate D completely removed therefrom.

At necessary intervals the plate D may be alternately retracted and extended for scraping the up-stream surface thereof so as to free such surface of accumulated matter. When cleaning the plate D, the valve C may be rotated in a counterclockwise direction as seen in Fig. 2 to the position shown in Fig. 3 so as to open passage 41 to chamber 7' and permit a solvent to be introduced to facilitate a cleaning operation, while at the same operation positioning the valve for scraping the plate.

Top member B may be made so as to be interchangeable with all exchanger units of a system and when removed from one unit may be applied to other similar units. Following the installation of a plate D in one unit, or the examination of a plate in a unit, the plate B' is attached to member A of the examined unit, as shown in Fig. 5 after the valve C has been operated to close chamber 7' as shown in Figs. 4 and 5.

The engagement of surface 24 of plate D with the surface 23 of casing A cooperates with the portions 30 and 31 on said casing and said plate, respectively, to wedge the plate to the right as shown in Fig. 2 into sealing engagement with ring F. The cylindrical portion 32 at the upper end of plate D is engaged by valve portion 10, as shown in Fig. 4, for urging the plate downwardly into concentric position with respect to passages E and E', while screw 27 at the bottom of the casing may be adjusted upwardly into snug contact with the lower end of the plate, thereby confining the plate in operative position.

Ring F, as is obvious, may be contracted so as to permit its insertion in the casing and by reason of its tension, when so inserted, the ring will expand and be held in its groove against displacement because of the tapered external periphery, as shown in Fig. 7.

Referring to Figs. 4 and 5, it will be noted that valve C is shown in closed position, and the valve must always be closed when the member B is removed, and at the same time the valve C should not be opened, even by accident, for the reason that otherwise the plate D might become elevated sufficiently to cause a leak of pressure around a portion, at least, of its periphery and thereby provide inaccurate readings on the meter M. To prevent such an occurrence I have provided a set screw 51 threaded through plate B' and having its inner end seated in an indentation 52 on the portion 10 of the valve.

When member B is in position on casing A, the pressure in chambers 7 and 7' may at times be equalized to and correspond to prevailing pressure in channel E by reason of leakage by plate D into chambers 7 and 7' except when valve C is closed and excess pressure in chamber 7 may be relieved by opening valve 38.

It may be noted also that the peculiar form of the bottom of plate D and the adjacent seat on the bottom of the casing permits of the slight raising of plate D so as to separate surfaces 23 and 24 without disengaging the plate from its sealing ring F. Thus, when screw 27 is removed, sediment may be drained through bore 26 by the employment of a suitable flushing fluid.

What I claim is:

1. A device of the character described comprising: a casing having a channel therethrough; an orifice plate mounted crosswise of said channel; manually operable means for inserting the orifice plate in, and retracting it from said channel, and including a cylindrical transverse chamber through which said plate is movable; a valve extended through said chamber and adjustable into selected position for closing the chamber to the atmosphere and opening the chamber to permit the removal of the orifice plate, said valve having an arcuate elongated outer surface closely fitting against a selected zone of the inner surface of said chamber and a surface joining the longitudinal edges of said sealing surface and spaced away from the path of the orifice plate during the removal of the orifice plate, the edges of the arcuate sealing surface of the valve and of the surface adjoining said arcuate surface affording scraping edges; and means mounting said valve for rotation in said cylinder, whereby said scraping edges may be brought into engagement with the lateral surfaces of said orifice plate so that a movement of the plate relative to the valve will remove matter deposited thereon.

2. A device of the character described comprising: a body having a longitudinal flow passage therethrough formed intermediate its extremites with a groove cut in the wall of the flow passage, a plate adapted to seat in said groove and to slide transversely of the flow passage into and from a position of obstruction to the flow of any element through the passage, and having a control orifice therein, said body having a transverse chamber outwardly of the flow passage for receiving said plate when it is retracting to inoperative position, a closure member hingedly secured to the body for closing said chamber, and a valve rotatably carried by the body on an axis at right angles to that of the flow passage and formed of a single segment spanning said chamber and operative to close the chamber against leakage when said hinged member is removed, and when in open position to be so positioned as to dispose the chordal surface thereof on an inclined plane relative to the sides of said plate so as to scrape the plate as it is moved to and from operative position, and thereby remove accumulations of matter on the plate without removing the plate from the device.

3. A device of the character described in claim 2 in which the wall of the flow passage is provided on the downstream side of the plate receiving groove with a second groove of frusto-conical form with its minimum diameter adjacent a side of the orifice plate, and a tensioned packing ring of corresponding cross section seated in the second groove.

4. A device as set forth in claim 1, and in addition comprising a cylindrical element secured to the upper edge of said orifice plate, the surface joining the edges of the arcuate surface of the valve being arranged to bear down against and hold closed the orifice plate while the valve is also in position for closing the cylindrical chamber to the atmosphere.

BERT E. ANDERSON.

REFERENCES CITED

The following references are of record in the file of this patent:

UNITED STATES PATENTS

| Number | Name | Date |
|---|---|---|
| 1,569,305 | Robinson | Jan. 12, 1926 |
| 1,792,950 | Welcome et al. | Feb. 17, 1931 |
| 1,808,715 | Reynolds | June 2, 1931 |
| 2,000,853 | Lange | May 7, 1935 |
| 2,014,682 | Greene | Sept. 17, 1935 |
| 2,050,544 | Robinson et al. | Aug. 11, 1936 |
| 2,079,896 | Brosius | May 11, 1937 |

FOREIGN PATENTS

| Number | Country | Date |
|---|---|---|
| 229,985 | Great Britain | Mar. 5, 1925 |
| 625,282 | Germany | Feb. 7, 1936 |